(12) United States Patent
Amaya et al.

(10) Patent No.: US 8,475,152 B2
(45) Date of Patent: Jul. 2, 2013

(54) APPARATUS FOR PRODUCING THREE-DIMENSIONAL SHAPED PRODUCT

(75) Inventors: Koichi Amaya, Fukui (JP); Yukinori Urushizaki, Fukui (JP); Hideto Matsubara, Fukui (JP)

(73) Assignee: Matsuura Machinery Corp., Fukui-shi, Fukui (JP)

( * ) Notice: Subject to any disclaimer, the term of this patent is extended or adjusted under 35 U.S.C. 154(b) by 455 days.

(21) Appl. No.: 12/836,266

(22) Filed: Jul. 14, 2010

(65) Prior Publication Data

US 2011/0256253 A1    Oct. 20, 2011

(30) Foreign Application Priority Data

Apr. 14, 2010   (JP) .................................. 2010-092912

(51) Int. Cl.
*B29C 35/08*   (2006.01)
*B29C 35/16*   (2006.01)

(52) U.S. Cl.
USPC .......................................... 425/375; 425/217

(58) Field of Classification Search
USPC .................. 425/78, 174.4, 405.1, 405.2, 470, 425/215–217, 384, 407, 375
See application file for complete search history.

(56) References Cited

U.S. PATENT DOCUMENTS

| 3,530,210 | A | * | 9/1970 | Patton ............................ 419/69 |
| 5,658,412 | A | | 8/1997 | Retallick et al. |
| 5,753,274 | A | | 5/1998 | Wilkening et al. |
| 2010/0155985 | A1 | * | 6/2010 | McAlea et al. ............ 425/174.4 |

FOREIGN PATENT DOCUMENTS

| JP | 4-255327 A | 9/1992 |
| JP | 7-501765 A | 2/1995 |
| JP | 8-281807 A | 10/1996 |

* cited by examiner

*Primary Examiner* — Richard Crispino
*Assistant Examiner* — Thukhanh Nguyen
(74) *Attorney, Agent, or Firm* — Richard M. Goldberg (57) ABSTRACT

An apparatus for producing a three-dimensional shaped product capable of decreasing thermal dissipation due to thermal conduction of a heating device or a cooling device loading a base plate, in which powder is sequentially sintered on a table and a base plate inside a shaping tank, wherein a space of vertical direction is formed on the table or the space is formed and a heat insulating material is filled into the thus formed region, a heating device or a cooling device which loads the base plate supporting the sintered layer is firmly fixed.

10 Claims, 8 Drawing Sheets

APPARATUS FOR PRODUCING THREE-DIMENSIONAL SHAPED PRODUCT

FIELD OF THE INVENTION

The present invention relates to an apparatus for producing a three-dimensional shaped product in which metal powder or non-metal powder loaded on a vertically movable table is laminated while being sintered by irradiating electromagnetic waves to each layer, thereby producing a predetermined three-dimensional shaped product.

DESCRIPTION OF THE RELATED ART

There have been proposed various configurations in technical fields where metal powder or non-metal powder is sintered by irradiation of electromagnetic waves such as laser beams or electron beams, thereby molding a three-dimensional shaped product. However, any configuration will always entail the following steps:
(a) a planarization step for spraying powder by allowing the powder to fall and sliding on the upper-side surface or in the vicinity of the thus sprayed powder,
(b) a step in which a region to be shaped is irradiated by electromagnetic waves such as laser beams or electron beams, thereby sintering the irradiated region, and
(c) a step in which the end part and the upper surface that have been sintered in the step (b) are cut with a rotating tool, thereby molding the end part and the upper surface, and the steps of (a), (b) and (c) are repeated to finally mold a necessary three-dimensional shape.

Where the step (c) is completed for a specific powder layer, the powder on or around an object to be shaped is decreased in height only by one layer and the step (a) is resumed on a next powder layer.

Therefore, the table which loads the powder is installed so as to move vertically.

Where a powder layer located at the lowest level is brought directly into contact with the upper surface of the table, the powder layer adheres to the upper surface of the table in the sintering step (b). Thereby, it is impossible to smoothly remove from the table an object which has been completely shaped.

In order to cope with the above situation, Patent Document 1 has adopted a configuration in which when powder is solidified by sintering ordinarily on the surface of a table (which is expressed as "support means 2" in Patent Document 1), a base plate is installed which is made by selecting a material adherable to the powder.

At work sites, in order to perform sintering of the step (b) at an appropriate temperature, in most cases, a heating device or a cooling device is installed in a state of being firmly attached to the lower side of the base plate. In the embodiment disclosed in Patent Document 1, a cooling device using a cooling pipe (cooling duct) is adopted.

Ordinarily, an existing shaped part is influenced by the movement of the planarization device described in the step (a). Therefore, for the purpose of preventing the movement of the shaped part in the above moving direction, it is necessary that the base plate and the heating device or the cooling device are kept stably on the surface of the table.

In view of the above necessity, in the conventional technologies, the heating device or the cooling device is integrated into a table as disclosed in Patent Document 1 or firmly fixed to the lower surface of the table.

However, in the conventional technologies, on heating, thermal energy on the base plate is conducted to result in lower heating efficiency. On cooling, the table is also cooled or unnecessarily cooled, thereby inevitably resulting in lower cooling efficiency.

[Patent Document 1] Japanese Patent No. 4054075

DISCLOSURE OF THE INVENTION

Problems to be Solved by the Invention

An object of the present invention is to provide an apparatus for producing a three-dimensional shaped product in which a base plate is interposed between a portion which is a region to be sintered among individual powder layers and a table, and also a configuration of the apparatus for producing a three-dimensional shaped product capable of preventing a decrease in heating efficiency of a heating device loading the base plate and also a decrease in cooling efficiency of a cooling device.

In order to attain the above object, the present invention is made up of the following basic configurations:

(1) an apparatus for producing a three-dimensional shaped product in which the following steps are sequentially repeated, that is, a step that metallic or non-metallic powder is sprayed on a base plate placed on the upper side of a vertically movable table in a shaping tank and having on the surface at least a material which can be adhered to the metallic or non-metallic powder upon solidification of the powder adjacent to the upper side by sintering and on the upper side of the table; a step that the upper-side surface of the thus sprayed powder is subjected to planarization and electromagnetic waves or electron beams are then irradiated along a layer having a predetermined thickness to a region to be shaped which is located at the uppermost position, thereby forming a sintered layer; and a step that the end part and the upper surface where the sintering has been performed are thereafter cut to effect molding, and the apparatus for producing a three-dimensional shaped product in which a space of vertical direction is formed on the table, or the space of vertical direction is formed and a heat insulating material is filled into the thus formed region, and a heating device or a cooling device which loads the base plate supporting the sintered layer is firmly fixed to the table, (2) the apparatus for producing a three-dimensional shaped product as described in the above (1) in which a base for supporting a heating pipe which constitutes a heating device or a cooling pipe which constitutes a cooling device is firmly fixed on the upper part of the table via a leg part below or laterally firmly fixed to a frame body or a supporting rod installed upright on the table, and (3) the apparatus for producing a three-dimensional shaped product as described in the above (1) in which a plurality of supports for holding a heating pipe which constitutes a heating device or a cooling pipe which constitutes a cooling device are extended below and firmly fixed on the upper part of the table or the supports are extended laterally and firmly fixed to a frame body or a supporting rod installed upright above from the table.

BRIEF DESCRIPTION OF THE DRAWINGS

FIGS. 1(a) and 1(b) explain a configuration of Example 1.

FIGS. 2(a) and 2(b) explain a constitution of Example 2.

FIGS. 5(a) and 5(b) explain an embodiment of the basic configuration (2) in which a base is firmly fixed on the upper part of the table via the leg part below.

FIGS. 6(a) and 6(b) explain an embodiment of the basic configuration (2) in which the base is firmly fixed laterally to the frame body or the supporting rod.

FIGS. 7(a) and 7(b) show an embodiment of the basic configuration (3) in which the support gripping the heating pipe or the cooling pipe is extended below and firmly fixed on the upper part of the table.

FIGS. 8(a) and 8(b) show an embodiment of the basic configuration (3) in which the support gripping the heating pipe or the cooling pipe is extended laterally and firmly fixed to the frame body or the supporting rod.

DESCRIPTION OF SYMBOLS

1: Shaping tank
2: Table
20: Insertion hole
21: Discharge opening
3: Base plate
30: Recess
4: Support
5: Leg part
6: Fixing bolt
7: frame body or supporting rod
8: heating device or cooling device
80: heating pipe or cooling pipe
81: heating source or cooling source
91: base
92: upper plate
10: opening and closing plate
11: perpendicular support
12: powder
13: shaped article
14: powder supporting plate

BEST MODE FOR CARRYING OUT THE INVENTION

The present invention relates to an apparatus for producing a three-dimensional shaped product based on a basic technical idea in which, as described in the basic configuration (1), a heating device or a cooling device 8 (hereinafter, abbreviated as "HC apparatus 8" based on the respective capital letters H and C of heating and cooling) loading a base plate 3 is provided so as to form a space from a table 2 in a vertical direction or a heat insulating material is filled into the thus formed space region, thereby exhibiting the previously described effect.

Then, the basic configuration (1) mainly includes an embodiment of the basic configuration (2) in which a base 91 integrally supporting a heating pipe or a cooling pipe 80 (hereinafter, abbreviated as "HC pipe 80" based on the respective capital letters H and C of heating and cooling) is fixed to the table 2 below or laterally and an embodiment of the basic configuration (3) in which the HC pipe 80 is not supported by the base 91 but the support 4 gripping the HC pipe 80 is extended and firmly fixed below or laterally.

Figure 5A:
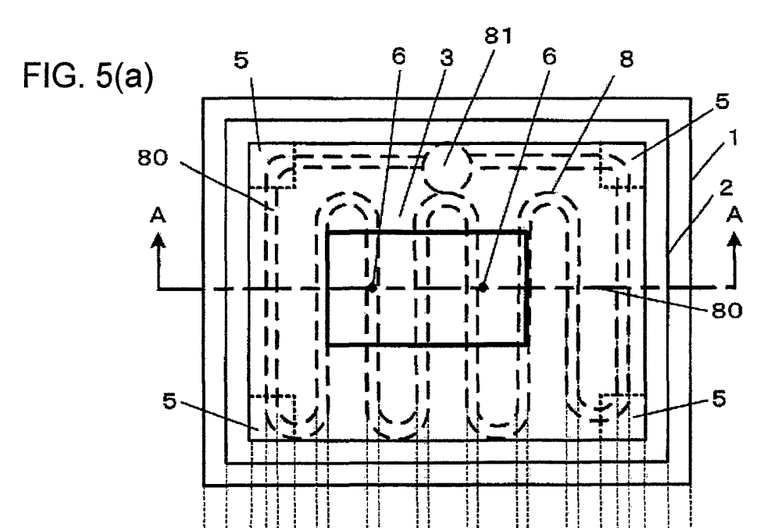
FIG. 5(a) is a plan view and FIG. 5(b) is a side cross-sectional view.
Figure 5B:
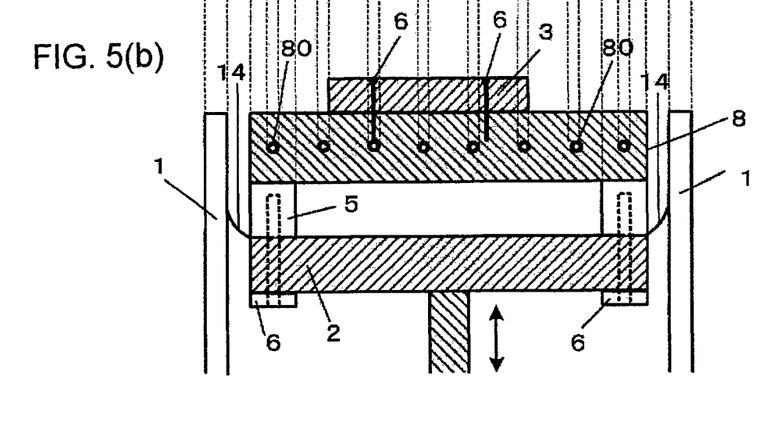
Figure 6A:
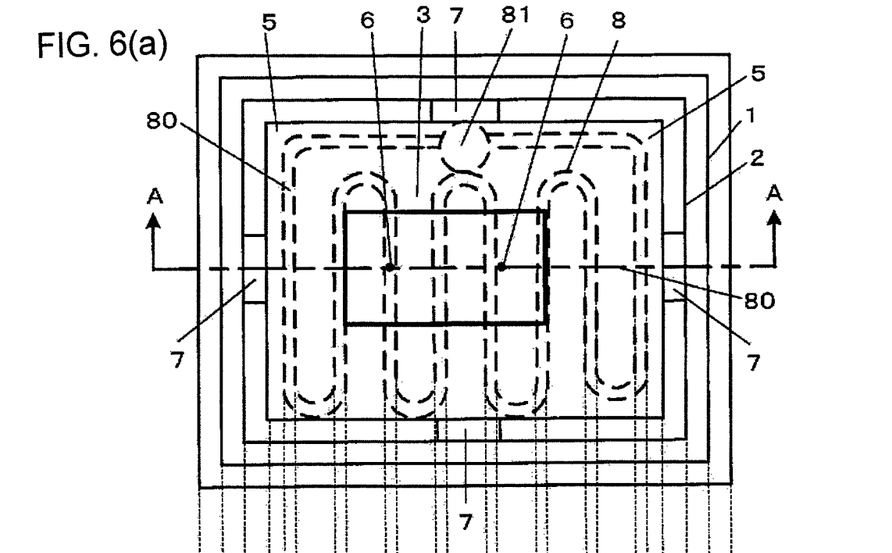
FIG. 6(a) is a plan view and FIG. 6(b) is a side cross-sectional view.

In the basic mode (2), as shown in FIGS. 5(a) and (b), the base 91 is firmly fixed to an upper part of the table 2 via a leg part 5 below or as shown in FIGS. 6(a) and (b), the base 91 is laterally firmly fixed to a frame body or a supporting rod 7 installed upright from above the table 2. Since the base 91 is firmly fixed as described above, a space having a predetermined distance in the vertical direction is formed between the lower face of the base 91 of the HC apparatus 8 and the upper face of the table 2 or the space is formed and a heat insulating material is then filled into the thus formed region.

In the basic configuration (2), in order to firmly fix the HC apparatus 8 to the table 2 stably, the leg part 5 used in firmly fixing the base as shown in FIGS. 5(a) and (b) and the frame body or the supporting rod 7 used in firmly fixing the base as shown in FIGS. 6(a) and (b) are to be provided in one unit respectively where the table 2 and the base 91 are surrounded. Or they are to be provided in two units respectively where lying astride both sides of the rectangular table 2 and the base 91. It is necessary that the leg part 5 and the frame body or the supporting rod 7 be provided at least in three units respectively excluding the above special cases.

Figure 6B:
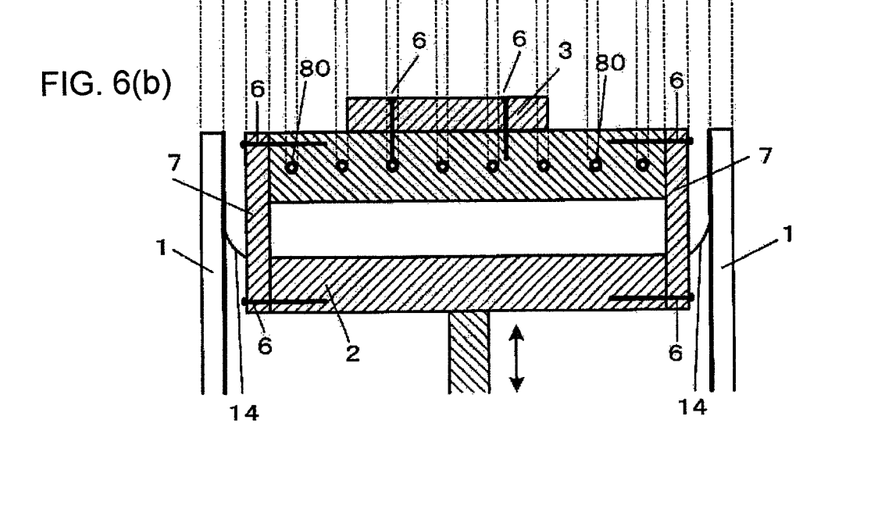

The frame body or the supporting rod 7 in the embodiments described in FIGS. 6(a) and (b) will be selected by whether or not a horizontal section area is greatly different from a section area of the table 2 based on technical common knowledge, that is, ¹⁄₁₀ or less. Where the horizontal section area is ¹⁄₁₀ or more than the cross section of the table 2, the frame body 7 is to be selected. While it is less than ¹⁄₁₀, the supporting rod 7 is to be selected. This is applicable in exactly the same manner as an explanation to be made hereinafter.

In order to prevent thermal conduction to the table and also realize effective heating or cooling, a vertical distance between the table 2 and the base 91 is preferably 15 mm or more.

In the basic mode (2), ordinarily, as shown in FIGS. 5(a) and (b) and FIGS. 6(a) and (b), there is often adopted an embodiment in which the base 91 covers the upper side of the HC pipe 80 as well and the base plate 3 is firmly fixed on the upper side of the base 91, that is, a configuration in which the base 91 has the HC pipe 80 embedded.

The basic configuration (2) is technically advantageous in that the table 2 can be firmly fixed to the base 91 and the base plate 3 can be placed stably on the base 91.

Figure 7A:
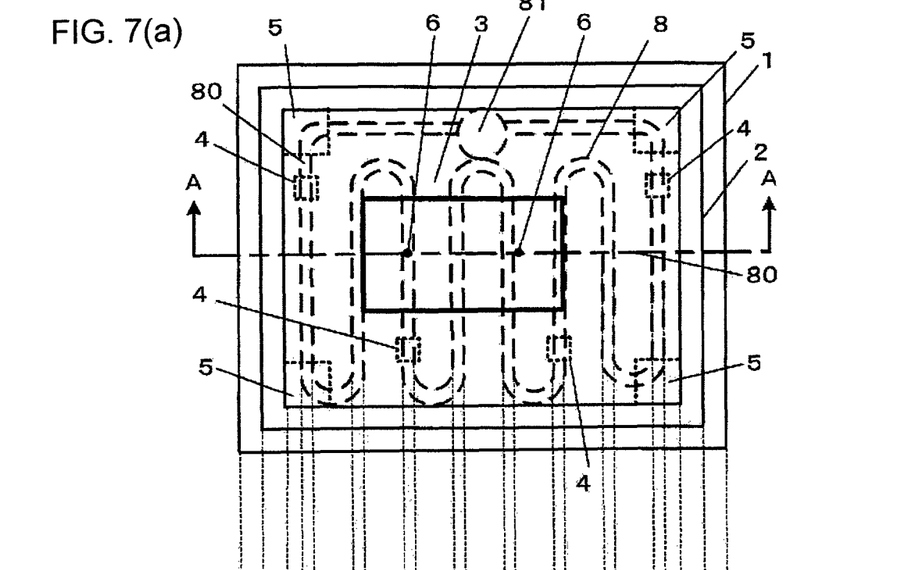
FIG. 7(a) is a plan view and FIG. 7(b) is a side cross-sectional view.
Figure 7B:
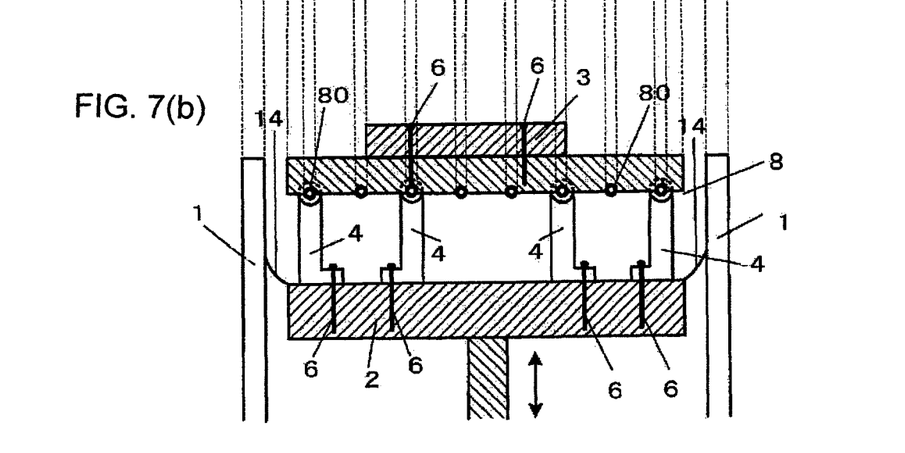
Figure 8A:
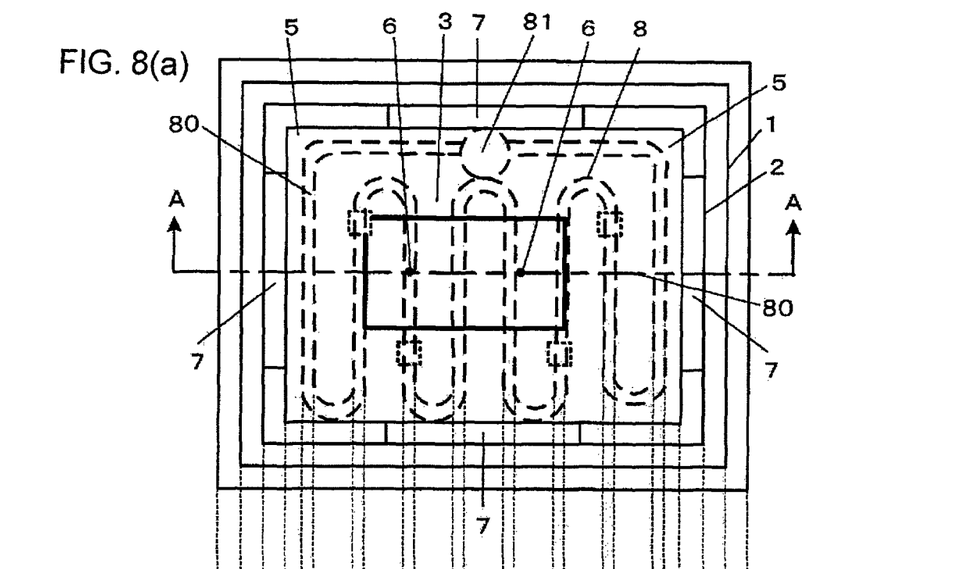
FIG. 8(a) is a plan view and FIG. 8(b) is a side cross-sectional view.
Figure 8B:
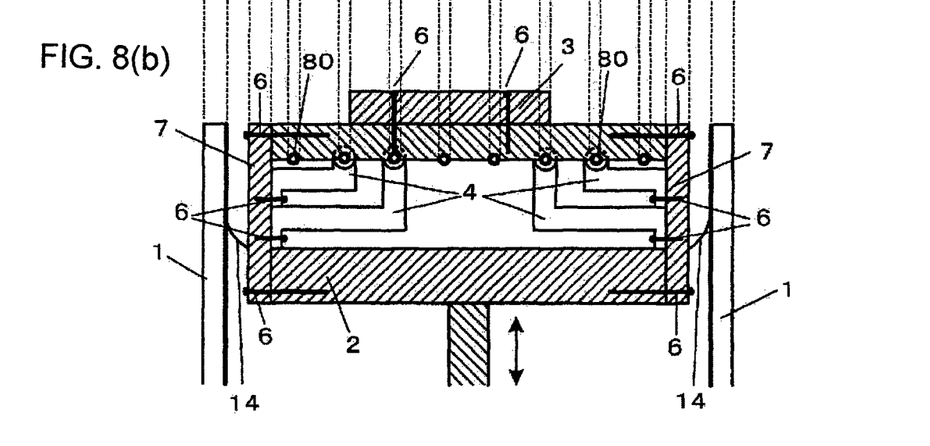

In the basic configuration (3), as shown in FIGS. 7(a) and (b), the support 4 gripping the HC pipe 80 is extended below and firmly fixed on the upper side of the table 2 or, as shown in FIGS. 8(a) and (b), the support 4 is extended laterally and firmly fixed to the frame body or the supporting rod 7 installed upright above from the table 2.

In order to firmly fix the HC pipe 80 stably to the table 2 in the basic configuration (3), it is necessary that the support 4 extending below as shown in FIGS. 7(a) and (b) and the support 4 extending laterally as shown in FIGS. 8(a) and (b) are provided respectively in three units or more.

In the basic configuration (3) as well, a clearance between the lower end of the HC pipe 80 and the table 2 is preferably 15 mm or more to realize effective heating or cooling.

In the basic configuration (3), ordinarily, as shown in FIGS. 7(a) and (b) and FIGS. 8(a) and (b), there is adopted such a configuration that the upper plate 92 is provided for covering an upper part of the HC pipe 80 and an upper part of the support 4 gripping the pipe 80, and the base plate 3 is firmly fixed on an upper side of the upper plate 92, that is, a configuration in which the base plate 3 is firmly fixed on the upper plate 92 which covers the upper side of the HC pipe 80 and also acts as a cover thereof.

The basic configuration (3) is technically advantageous in that the HC apparatus 8 can be installed easily.

In any one of the cases shown in FIGS. 5, 6, 7 and 8, the HC apparatus 8 is substantially similar in area to the table 2 in the lateral direction. However, the design of the HC apparatus 8 shall not be limited to these cases of the present invention.

Figure 9:
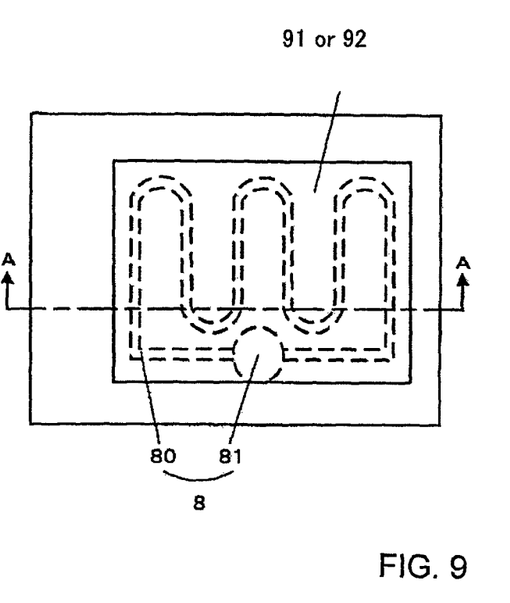
FIG. 9 is a plan view showing an embodiment in which the heating device or the cooling device is installed on a part of the table.

To be more specific, as shown in FIG. 9, as a matter of course, such a configuration is adoptable that the HC apparatus 8 is installed on a part of the table 2. (In FIG. 9, both the base 91 of the embodiment (2) and the upper plate 92 of the embodiment (3) are commonly illustrated but the base plate 3 is not illustrated.)

EXAMPLES

Hereinafter, an explanation will be made by referring to examples.

Example 1

Figure 1A:
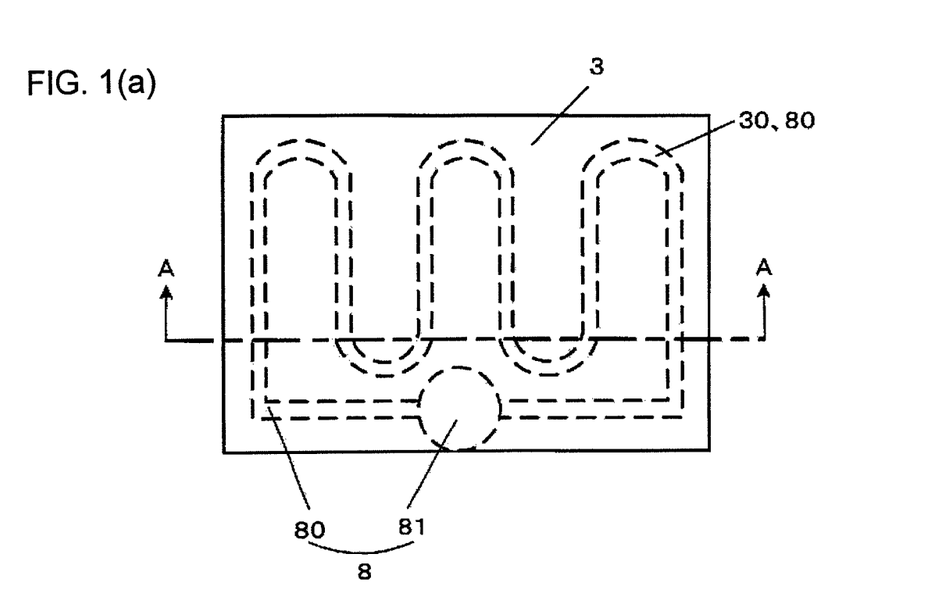
FIG. 1(a) is a plan view and FIG. 1(b) is a side cross-sectional view.
Figure 1B:
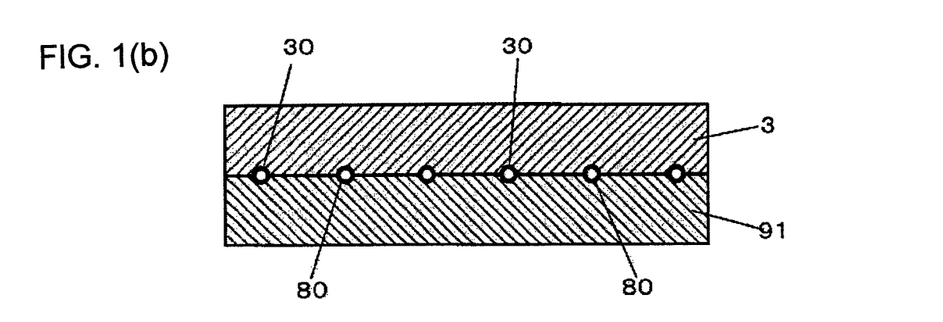

As shown in FIG. 1, Example 1 is characterized in that, in the basic configuration (2), a base 91 does not cover ½ or more of an upper part of an HC pipe 80 on the basis of the height direction thereof, and a recess 30 provided below a base plate 3 is fitted into the upper part of the HC pipe 80. (In FIGS. 1(a) and 1(b), constituents used in firmly fixing the HC apparatus 8 such as a leg part 5, a frame body or a supporting rod 7 are not illustrated.)

As long as the base plate 3 has already loaded a substantial amount of powder 12 on the upper part thereof in the step (a) and the powder 12 has been sintered in the step (b), a substantial weight acts on the HC pipe 80 from the base plate 3.

Therefore, the recess 30 is fitted into the HC pipe 80, by which the base plate 3 of the HC apparatus 8 is installed stably. As described in the embodiments of FIGS. 5 and 6, there is no need for fixing the base plate 3 to the HC apparatus 8 with a fixing bolt 6 and others, which is quite convenient.

Example 2

Figure 2A:
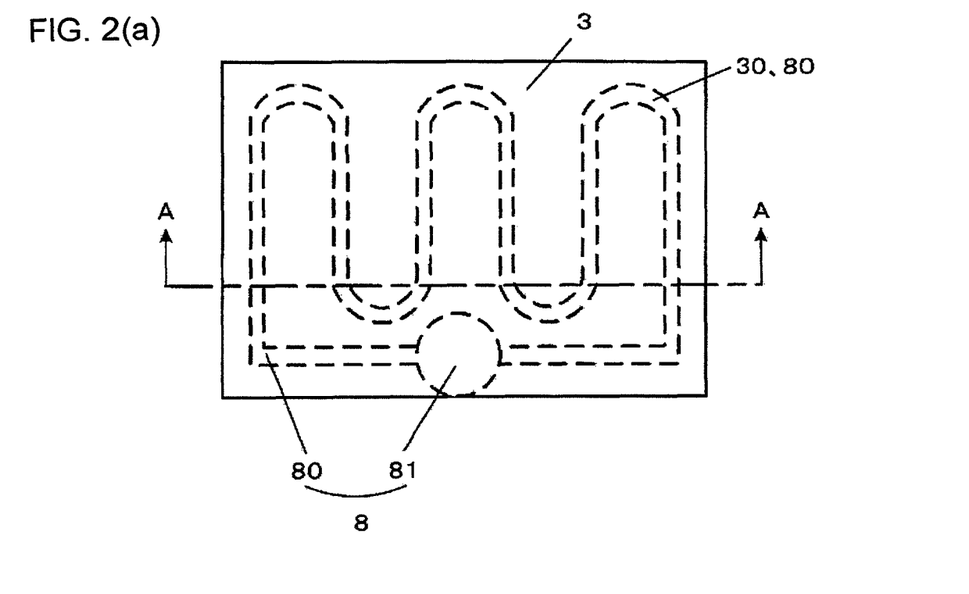
FIG. 2(a) is a plan view and FIG. 2(b) is a side cross-sectional view.
Figure 2B:
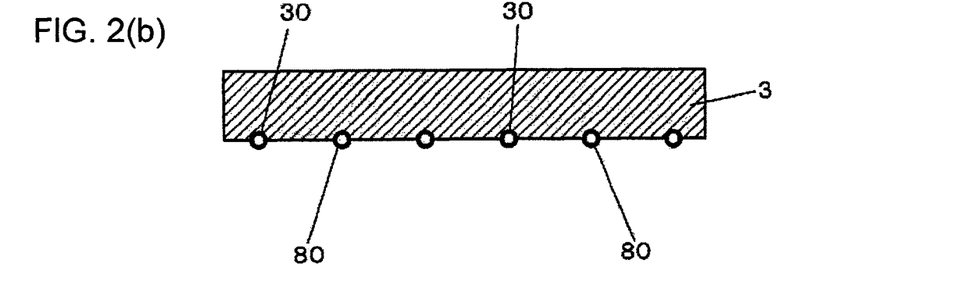

As shown in FIG. 2, Example 2 is characterized in that, in the basic configuration (3), the upper part of the HC pipe 80 is not covered and the recess 30 provided below the base plate 3 is fitted into the upper part of the HC pipe 80. (In FIG. 1, constituents used in firmly fixing the HC apparatus 8 such as the support 4, the frame body or the supporting rod 7 are not illustrated.)

On the basis of grounds similar to that of Example 1, in Example 2 as well, the base plate 3 can be supported stably on the HC apparatus 8. There is no need for firmly fixing the base plate 3 to the HC apparatus 8 with a fixing bolt 6 and others, which is quite convenient.

Example 3

Figure 3:
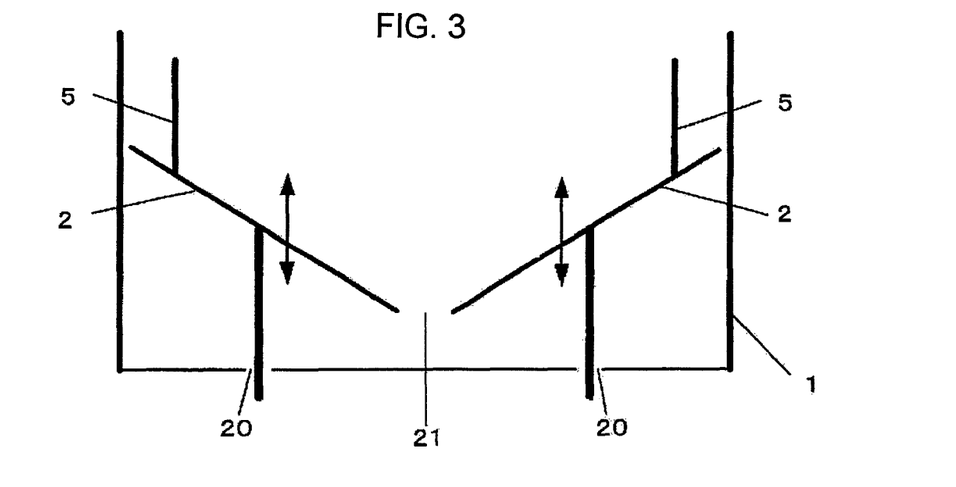
FIG. 3 is a perpendicular side cross-sectional view showing a configuration of the table in Example 3. (It is noted that a heating device or a cooling device as well as a leg part, a support, a frame body or a supporting rod and others for connecting the table with the devices are not illustrated.)

As shown in FIG. 3, Example 3 is characterized in that an inclined state which sequentially lowers is formed on the table 2 and a discharge opening 21 for discharging the powder 12 which has not been sintered is provided at a lower end part of the inclined part.

Where the powder 12 is loaded on the table 2 and the surface of the base plate 3, all the powder 12 is not necessarily subjected to sintering.

In this case, the powder 12 which is not sintered remains inevitably at the lower part of the table 2, after the shaped article 13 is taken out above from the table 2, together with the base plate 3.

In Example 3, the remaining powder 12 comes down along a lower part of the inclined part and can be discharged into the lower part of the shaping tank 1 via an opening located at the lowest position. It is, therefore, possible to reuse the powder 12.

In order to exhibit the effect of Example 3 as much as possible, as shown in FIG. 3, it is preferable that the end of the table 2 is brought closer to an inner wall of the shaping tank 1.

Figure 4:
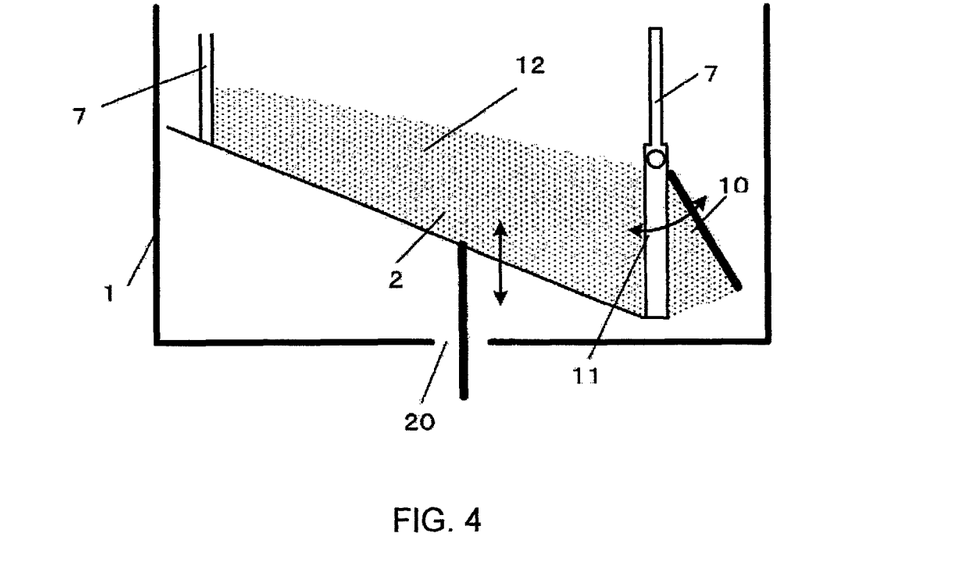
FIG. 4 is a perpendicular side cross-sectional view showing a configuration of the table in Example 4. (It is noted that the heating device or the cooling device as well as the leg part, the support, the frame body or the supporting rod and others for connecting the table with the devices are not illustrated.)

However, in this instance, as shown in FIG. 4, the leg part 5, the support 4, the frame body or the supporting rod 7 used in firmly fixing the HC apparatus 8 are installed on an inclined surface and firmly fixed thereto. (FIG. 3 shows a case where the leg part 5 is provided.)

Example 4

As shown in FIG. 4, Example 4 is characterized in that table 2 forms an inclined state which sequentially lowers from one side of two mutually opposing sides to the other side, the frame body or the support rod 7 is supported via two perpendicular supports 11 on the other side, and between the two perpendicular supports 11, provided is an opening and closing plate 10 capable of moving rotationally on the upper end of the two perpendicular supports 11 or on one of the two perpendicular supports 11.

Similar to Example 3, also in Example 4, the powder 12 which has not been subjected to sintering or shaping is allowed to fall on the surface of the table 2, and the opening and closing plate 10 located between the perpendicular supports 11 is opened, by which the powder 12 can be discharged outside from the surface of the table 2. Thereby, the powder 12 can be effectively discharged outside and the powder 12 can be reused similar to Example 3. (FIG. 3 shows a state that the opening and closing plate 10 capable of moving rotationally is opened at the upper ends of two perpendicular supports 11, but in a stage of shaping, as a matter of course, the opening and closing plate 10 is located between the perpendicular supports 11 and closed.)

In Example 4 as well, in order to exhibit the above effect, it is preferable that the end of the table 2 is brought closer to an inner wall of the shaping tank 1.

However, similar to Example 3, the leg part 5, the support 4, the frame body or the supporting rod 7 used in firmly fixing the HC apparatus 8 are installed on an inclined surface and firmly fixed thereto. (FIG. 4 shows a case where the frame body or the supporting rod 7 is provided.)

Effects of the Invention

On the basis of the basic configurations (1), (2) and (3), in the present invention, a space of vertical direction is formed between a heating device or a cooling device and a table. Thereby, unnecessary heating or cooling can be avoided to attain efficient heating and cooling.

Further, in the configuration disclosed in Patent Document 1, the table is consequently required to be planar. However, in the above-described basic configuration, as described in Example 3 and Example 4, an inclined state is developed on the table, thus making it possible to adopt a configuration capable of easily discharging powder which has not been sintered.

The present invention is applicable to any and all configurations of an apparatus for producing a three-dimensional shaped product using a base plate.

The invention claimed is:

1. An apparatus for producing a three-dimensional shaped product, comprising:
   a shaping tank,
   an inclined, vertically movable table in the shaping tank which is inclined from a first end downwardly toward a second end, and the first raised end being provided close to an inner wall of the shaping tank,
   a base plate which supports a metallic or non-metallic powder material, the base plate firmly fixed to the table with a space extending in a vertical direction formed above the table and under the base plate such that the lower surface of the base plate is out of contact with the upper surface of the table, wherein the space is one of:
      filled with an insulating material, and
      not filled with an insulating material, and
   one of a heating device and a cooling device which loads the base plate that supports the powder, and
   a discharge opening for discharging powder which is not sintered, provided at a lower end of the inclined table for reusing discharged powder,
   wherein the following steps are sequentially repeated:
   spraying one of the metallic and non-metallic powder on a surface of the base plate, with the surface of the base plate having at least a material which can be adhered to the metallic or non-metallic powder upon solidification of the powder,
   subjecting an upper surface of the thus sprayed powder to planarization,
   irradiating one of electromagnetic waves and electron beams along a layer of the powder having a predetermined thickness to a region to be shaped which is located at an uppermost position, thereby forming a sintered layer, and
   cutting at least one of an end part and upper surface where sintering has been performed to effect molding.

2. The apparatus for producing a three-dimensional shaped product according to claim 1, wherein
   the base is firmly fixed to an upper part of the table by one of:
      a leg part that extends below the base plate, and
      a supporting rod that extends laterally of the base plate.

3. The apparatus for producing a three-dimensional shaped product according to claim 2, wherein the space extending in the vertical direction provides a clearance between the base and the table of at least 15 mm.

4. The apparatus for producing a three-dimensional shaped product according to claim 1,
   wherein the heating device includes a heating pipe and the cooling device includes a cooling pipe,
   further comprising a base which covers an upper side of the one of the heating pipe and the cooling pipe, and
   the base plate is firmly fixed on an upper side of the base.

5. The apparatus for producing a three-dimensional shaped product according to claim 1, wherein
   the heating device includes a heating pipe and the cooling device includes a cooling pipe,
   the base does not cover more than one-half of a lower part of the one of the heating pipe and the cooling pipe on the basis of a height direction thereof, and
   a recess provided at an underside of the base plate is fitted into an upper part of the one of the heating pipe and the cooling pipe.

6. The apparatus for producing a three-dimensional shaped product according to claim 1,
   wherein the heating device includes a heating pipe and the cooling device includes a cooling pipe,
   further comprising a plurality of supports gripping the one of the heating pipe and the cooling pipe extend below the one of the heating pipe and cooling pipe, and are firmly fixed on an upper part of the table, and
   wherein the supports extend laterally and are firmly fixed to one of:
      a frame body, and
      a supporting rod installed upright above from the table.

7. The apparatus for producing a three-dimensional shaped product according to claim 6, wherein one of:
   a space extending in the vertical direction between a lower end of the one of the heating pipe and the cooling pipe, and the table, and
   the space filled with the heat insulating material is at least 15 mm.

8. The apparatus for producing a three-dimensional shaped product according to claim 6,
   further comprising an upper plate provided for covering an upper part of the one of the heating pipe and the cooling pipe, and
   wherein the base plate is firmly fixed on an upper side of the upper plate.

9. The apparatus for producing a three-dimensional shaped product according to claim 6, wherein:
   an upper part of the one of the heating pipe and the cooling pipe is not covered and
   a recess provided at an underside of the base plate is fitted onto the upper part of the one of the heating pipe and the cooling pipe.

10. The apparatus for producing a three-dimensional shaped product according to claim 1, wherein:
    one of a frame body and a supporting rod is supported on the second end via two perpendicular supports, and
    an opening and closing plate is provided between the two perpendicular supports for rotationally moving on an upper end of at least one of the two perpendicular supports, in order to form said discharge opening.

* * * * *